United States Patent [19]
Carpenter

[11] Patent Number: 5,478,428
[45] Date of Patent: Dec. 26, 1995

[54] LABEL SEPARATOR AND METHOD FOR SEPARATING A LABEL FROM A BACKING

[75] Inventor: George F. Carpenter, Rockford, Mich.

[73] Assignee: Grand Rapids Label Company, Grand Rapids, Mich.

[21] Appl. No.: 284,094

[22] Filed: Aug. 1, 1994

[51] Int. Cl.$^6$ .................................................. B32B 35/00
[52] U.S. Cl. ................ 156/344; 156/584; 271/281; 271/285; 271/110; 271/111
[58] Field of Search ................... 156/344, 584; 271/110, 111, 280, 281, 285

[56] References Cited

U.S. PATENT DOCUMENTS

| | | | |
|---|---|---|---|
| 3,017,179 | 1/1962 | Stuckens | 271/285 |
| 3,266,797 | 8/1966 | Stievenart | 271/285 |
| 4,173,510 | 11/1979 | Tobey | 156/584 |
| 4,240,862 | 12/1980 | Ishiyama | 156/584 X |
| 4,840,694 | 6/1989 | Brookman et al. | 156/344 |
| 4,959,115 | 9/1990 | Lacy | 156/269 X |
| 5,169,476 | 12/1992 | Silveira et al. | 156/584 X |

FOREIGN PATENT DOCUMENTS

| | | | |
|---|---|---|---|
| 1-203158 | 8/1989 | Japan | 271/285 |

*Primary Examiner*—Mark A. Osele
*Attorney, Agent, or Firm*—Varnum, Riddering, Schmidt & Howlett

[57] ABSTRACT

A label separator separates labels from a backing. An infeed mechanism moves the labels in a downstream direction through a label path toward a breaker bar. A push member is moveable from a first position to a second position through a path which intersects the label path whereby the push member intersects the leading end of the backing in the label path and directs the backing out of the label path, around the breaker bar and to one side of the push member while the label continues along the label path on another side of the push member.

20 Claims, 6 Drawing Sheets

LABEL SEPARATOR AND METHOD FOR SEPARATING A LABEL FROM A BACKING

BACKGROUND OF THE INVENTION

1. Field of the Invention

This invention relates to label separators for separating an adhesive label from a protective backing, and to a method for separating a label from its backing.

2. Description of Related Art

Preprinted labels having an adhesive surface are used on a variety of products and packagings. Prior to application, such labels are typically provided with a protective backing in contact with their adhesive surface. To apply the label, it is removed from its protective backing and placed in a desired location upon the product or packaging.

In many instances, a large volume of labels must be placed on a large volume of products or packaging in an assembly line procedure. However, removing the label from the backing can often be difficult. Typically, a section of label material is applied to a protective backing having identical dimensions. The label has somewhat smaller dimensions than the full section of label material. The label is commonly separated from the remainder of the label material by a circumferential cut line which penetrates the label material but not the backing material. Often however, the excess label material surrounding the label, commonly referred to as the matrix, is removed or otherwise not present. To separate label from the backing material by hand, a worker creases the label material at the label cut line and peels the backing material away from the edge of the label at the cut line. The user can then grasp the label and remove it from the backing material. The process is time-consuming and can be somewhat difficult.

Prior art arrangements for automatically removing labels from a roll of backing material are known. In such systems the backing material is wound onto a large roller and passed over a breaker bar at an acute angle causing the backing material to bend and separate from the label. One such prior art arrangement is disclosed in U.S. Pat. No. 4,480,694, issued Jun. 20, 1989. However, storing rolls of labels is an inefficient use of storage space. Stacked sheets of labels store much more compactly. Prior systems have failed to provide a suitable automatic process for removing the labels from the backing when employing separate sheets of labels.

SUMMARY OF THE INVENTION

The present invention solves these and other problems by providing a apparatus for automatically separating a label from its protective backing and placing the label thus separated into a convenient position whereby it may be grasped by a user.

In accordance with the present invention, a label separator comprises an infeed mechanism for moving the label with the backing in a downstream direction from an input station to a separating position adjacent a breaker bar. A push member movable relative to the leading edge of the breaker bar engages the leading end of the backing when the backing and label are in the separating position and diverts the leading end of the backing from the downstream direction. Further movement of the label in the downstream direction causes the label to be separated from the backing and allows the label to be advanced to a label removing position.

In one particular embodiment of the invention, the push member comprises a roller supported between a pair of pivot arms pivoting about an axis extending parallel the breaker bar. The infeed mechanism and push member are operated under control of a controller. The push member is mounted on a sliding frame and the controller is operative to control movement of the push member from a first position above the breaker bar to a second position partially beneath the breaker bar.

BRIEF DESCRIPTION OF THE DRAWINGS

The invention will now be described with reference to the drawings wherein.

DETAILED DESCRIPTION

Figure 1:
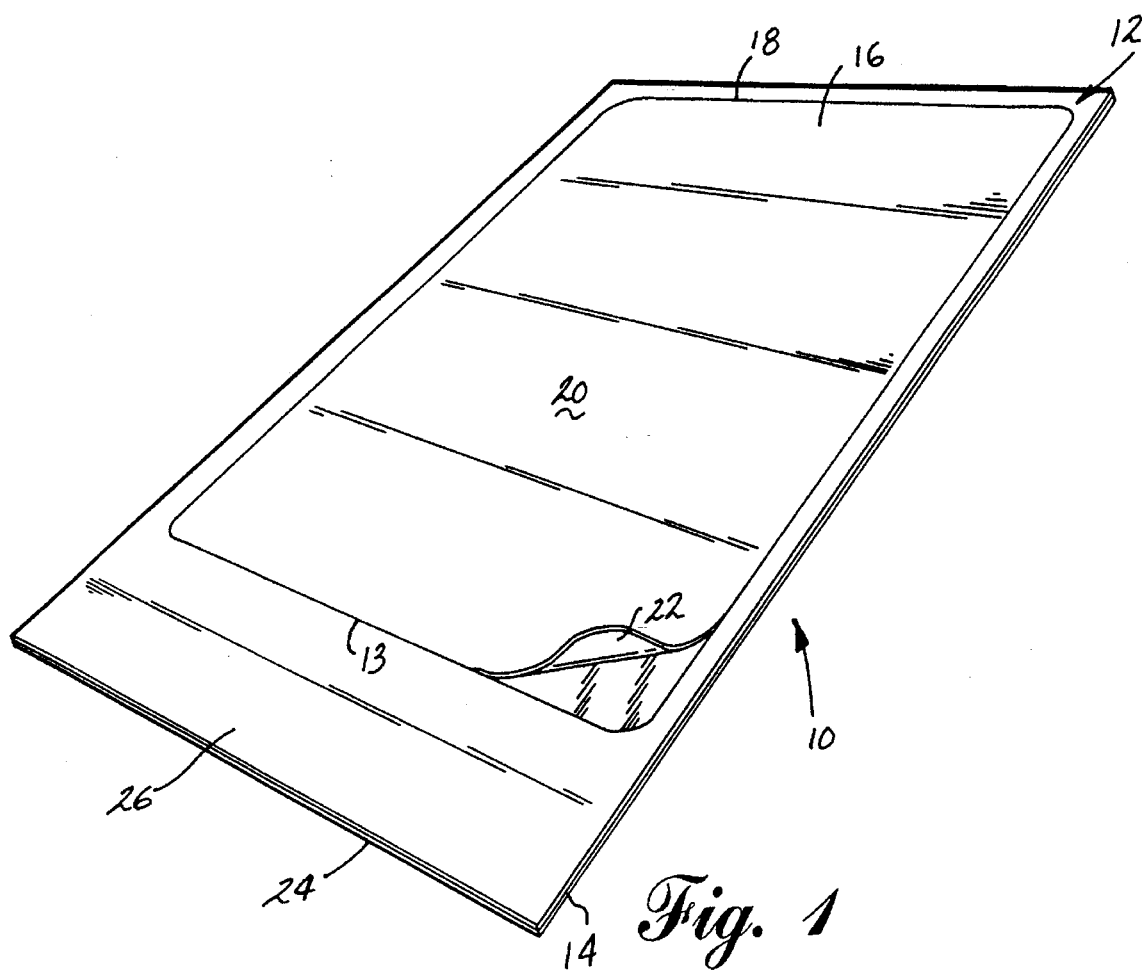
FIG. 1 is a perspective view of a label on its protective backing.

Turning to the drawings, FIG. 1 shows a label 10 cut in a section of adhesive label material 12 on a section of backing material 14. The label 16 may be surrounded by a matrix section 17 of the label material 12 including a leading end 26 on the backing 14. A front face 20 may be printed with words or designs and a rear face 22 is provided with an adhesive for adhering the label 16 to a desired surface (not shown). The label 16 has a leading edge 13 spaced from a leading edge 24 of the backing 14, providing an enlarged leading end 26 which can be folded down and manipulated to separate the label 16 from the backing 14 and the matrix section 17. Although not shown in the figures, the label 16 may alternatively be placed on a larger dimensioned sheet of backing 14 without the matrix 17 of the label material 12.

Figure 2:
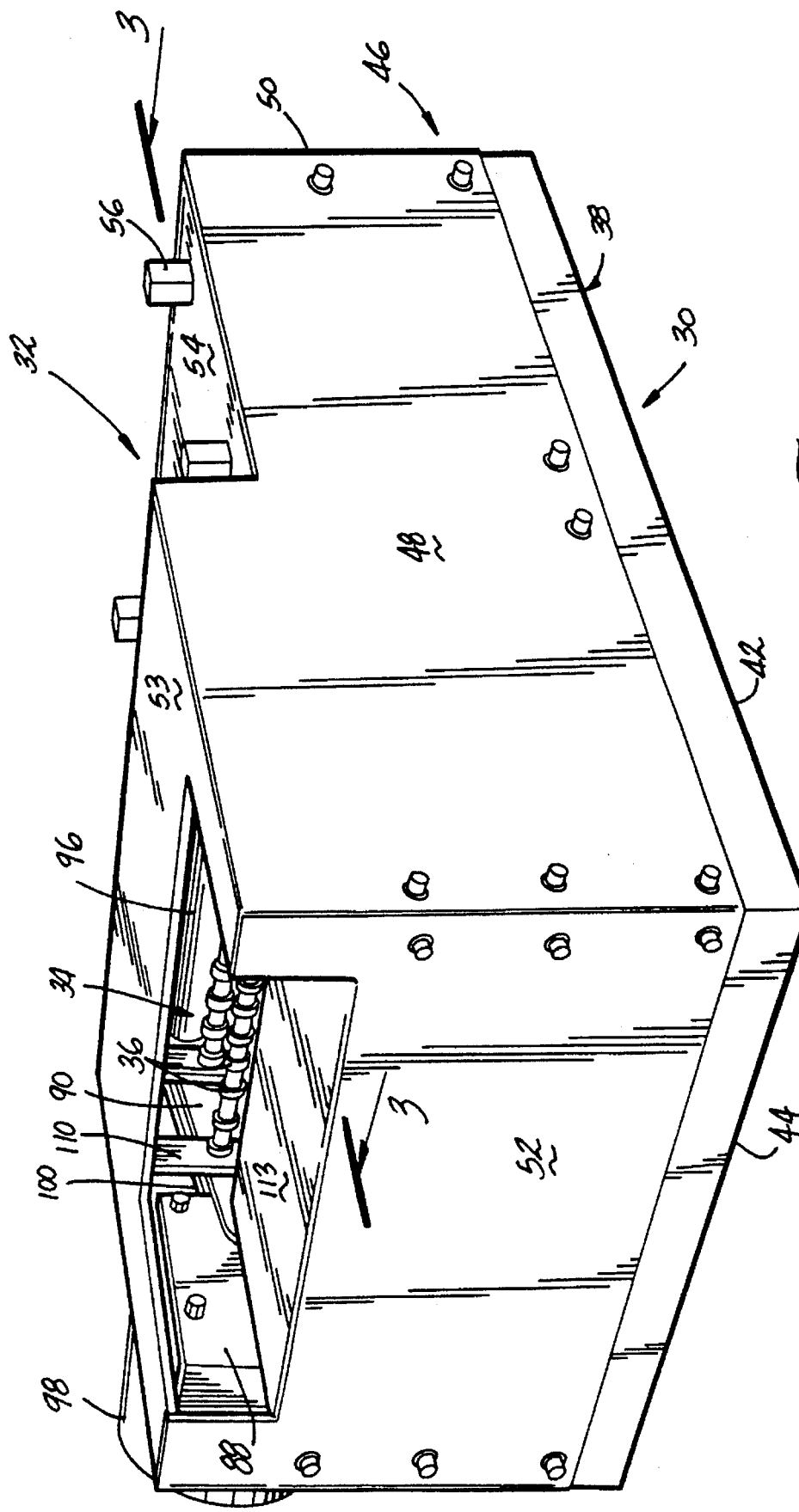
FIG. 2 is a perspective view of a label separator according to the invention.

FIG. 2 shows a label separator 30 according to the invention. The label separator 30 comprises generally an entry port 32, a separation section 34, and a pair of Teflon™ coated rollers 36 for receiving a label separated from its backing 16 (not shown in FIG. 2), all of which are supported upon a base 38. The base 38 has a front base portion 40, a central base portion 42, and a rear base portion 44. The entry port 32 is supported above the front base portion 40 by a framing enclosure 46 comprising side panels 48 and a front panel 50 on the input end of the separator. The framing enclosure 46 also comprises a rear panel 52 on the output end of separator and a top panel 53. The entry port 32 comprises a loading platform 54 having four guide posts 56 for guiding a label and its backing toward the separation section 34.

Figure 3:
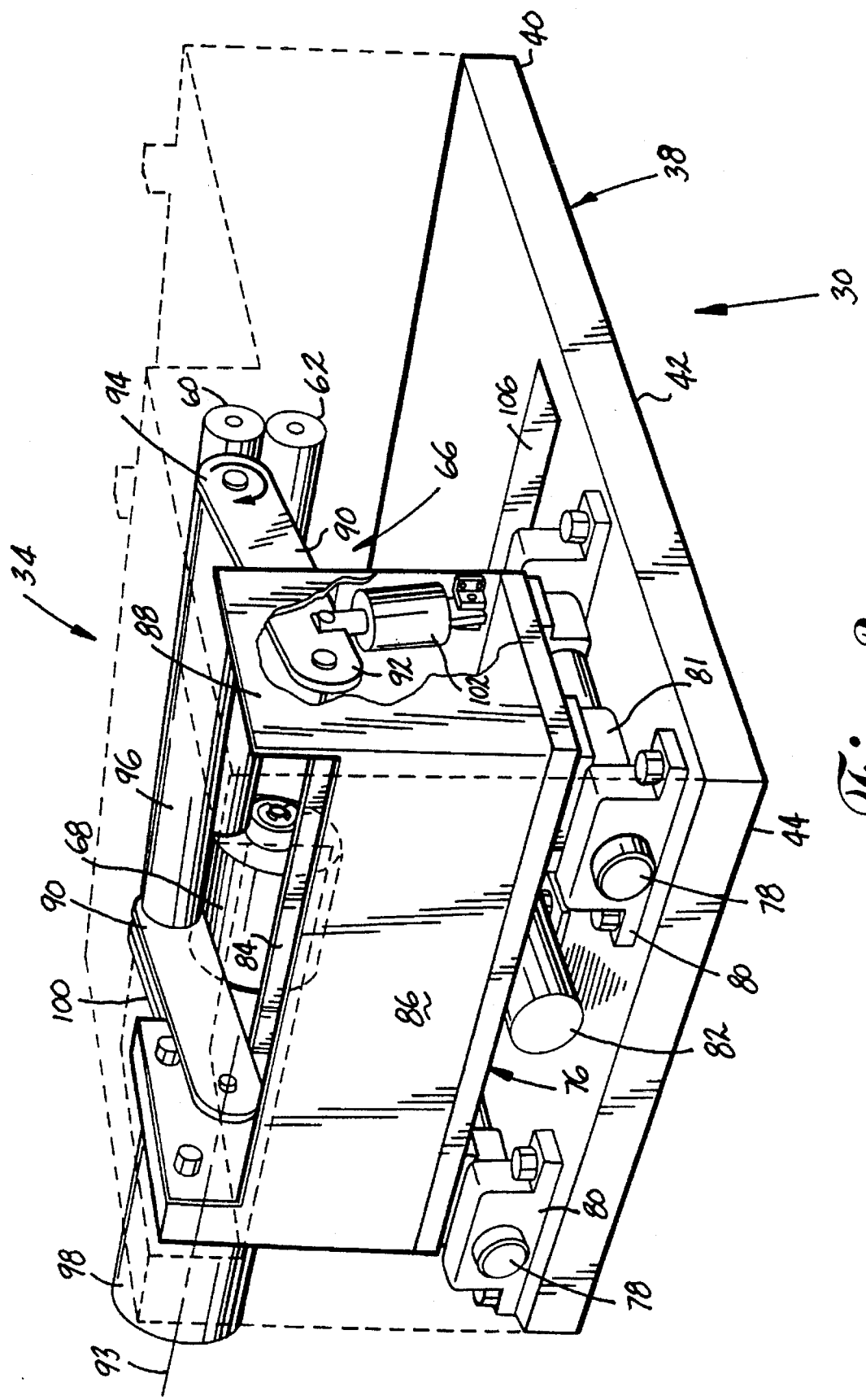
FIG. 3 is a perspective view of the label separator of FIG. 2 with an enclosure shown in phantom.
Figure 4:
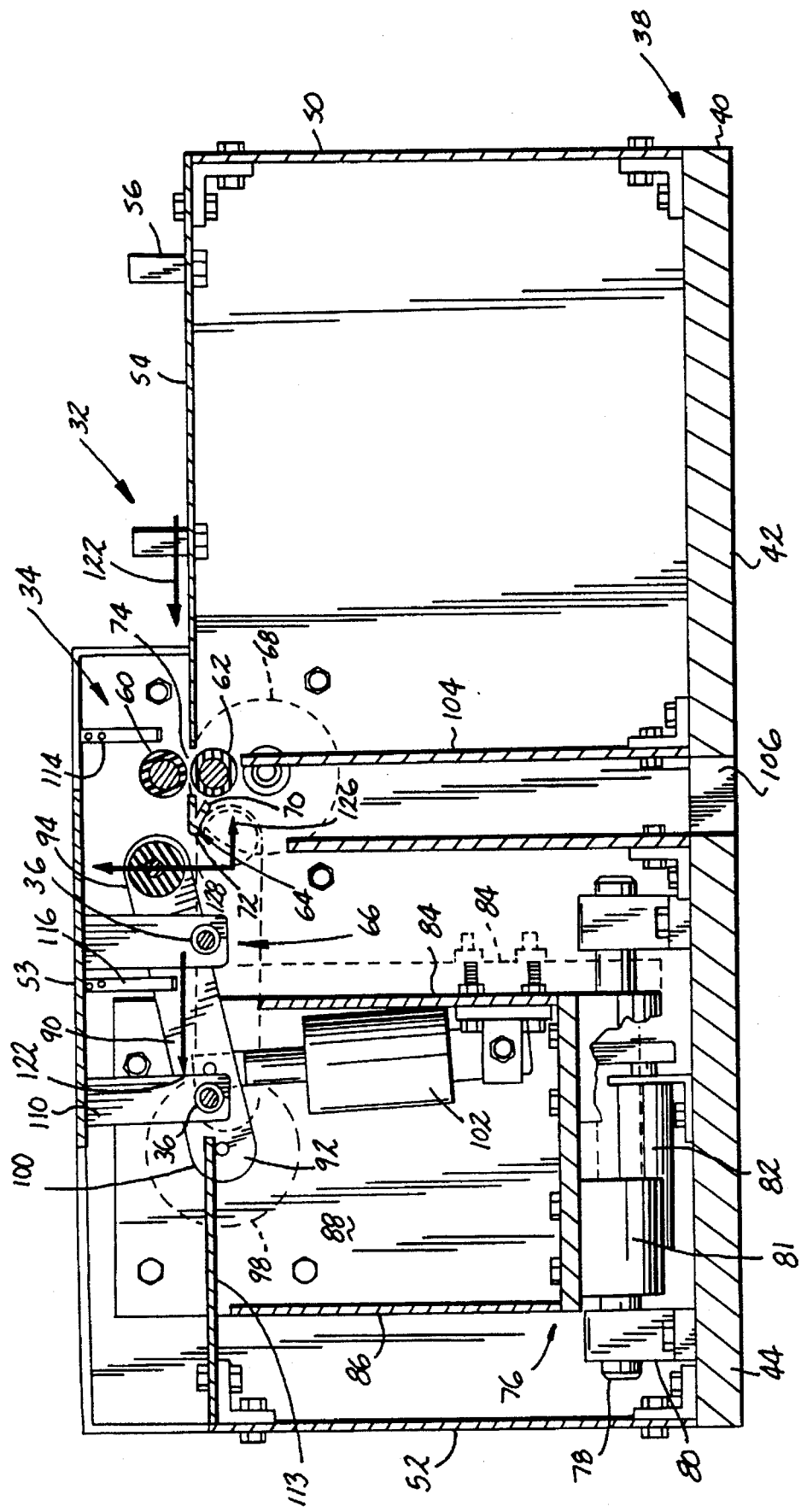
FIG. 4 is a side elevation view in section taken along lines 4—4 of FIG. 2.

Referring to FIGS. 3 and 4, the separation section 34 comprises upper and lower infeed rollers 60 and 62, a breaker bar 64, and a breaker mechanism 66. An infeed stepping motor 68 drives the upper and lower infeed rollers and 60 and 62 which are located respectively immediately above and immediately below the loading platform 54. The breaker bar 64 is located immediately to the rear of the rollers 60 and 62 and comprises a leading edge of the loading platform 54 having a forwardly and downwardly directed return flange 70 and a rounded leading edge 72. The upper and lower infeed rollers 60 and 62 are disposed within an elongated horizontal gap 74 in the loading platform 54 adjacent the breaker bar 64.

The breaker mechanism 66 comprises a sliding frame 76 mounted for fore and aft movement on a pair of rod guides 78 mounted slightly above the base rear portion 44 on stanchions 80. Bearings 81 on the sliding frame 76 slidably receive the rod guides 78 so that the sliding frame 76 is slidable along the rods guide 78. A horizontally disposed pneumatic or hydraulic cylinder 82, mounted to the base 38 and connected to the sliding frame 76, controls the fore and aft movement of the sliding frame 76.

The sliding frame 76 also comprises front, rear and side panels 84, 86 and 88, respectively. A pair of pivot arms 90 are mounted to each of the side panels 88. Each pivot arm comprises a free end 94 adjacent the breaker bar 64 and a mounted end 92 pivotably attached to one of the side panels 88. The arms 90 pivot about an axis 93 parallel to the breaker bar 64. A pressing roller 96 extends horizontally between the free ends 94 of the two pivot arms 90. A pressing roller motor 98 which is preferably a stepping motor attaches to the sliding frame 76 but is located outside of the enclosure 46. It drives a belt 100 by means of a standard pulley (not shown in the drawing). The belt 100 engages a pulley (not shown) on the pressing roller 96. The pressing roller is rotated in the clockwise direction, as indicated by the arrow in FIG. 3. A vertically disposed pneumatic or hydraulic cylinder 102 affixes to the sliding frame front panel 84 and to one of the pivot arms 90 to control upward and downward pivoting motions of the pivot arms 90 and thus of the pressing roller 96. The pressing roller 96 is moveable from a position slightly above and to the rear of the breaker bar leading edge 72 into a position directly below the breaker bar leading edge 72.

An exhaust chute 104 extends vertically from below the breaker bar 64 to an exit aperture 106 through the base 38 at its central portion 42 and provides a passage for removing label backings (not shown in FIG. 4) from the label separator 30. The exit rollers 36 provide for removal of labels (also not shown in FIG. 4) from the label separator 30. Exit rollers 36 are suspended from the top panel 53 of the enclosure 46 by two pairs of arms 110. The arms 110 are mounted inside of the pivot arms 90 so that the exit rollers 36 and their mounting arms 110 do not interfere with the action of the pivot arms 90. The exit rollers 36 are provided with a series of annular lands 112 and are preferably coated with Teflon™ or other non-stick coating surface to prevent the label 16 from sticking to them. An exit platform 113 attaches to the enclosure 46 immediately to the rear of the exit rollers 36 and mainly functions to guard the interior of the label separator 30 but may also receive a label 16 if it should happen to pass completely over the exit rollers 36.

An entry photo-sensor 114 is provided adjacent the infeed rollers 60 and 62 to detect the presence of an incoming label. An exit photo-sensor 116 is provided over the exit rollers 36 to detect the presence of a label. A controller 118 is electrically connected to the photo-sensors 114 and 116, the stepper motors 68 and 98, and valves (not shown in the drawing) controlling operation of the cylinders 82 and 102. Controller 118 may be a standard, commercially available, programmable controller programmed in a well-known manner to control the operation of the connected devices.

Figure 5:
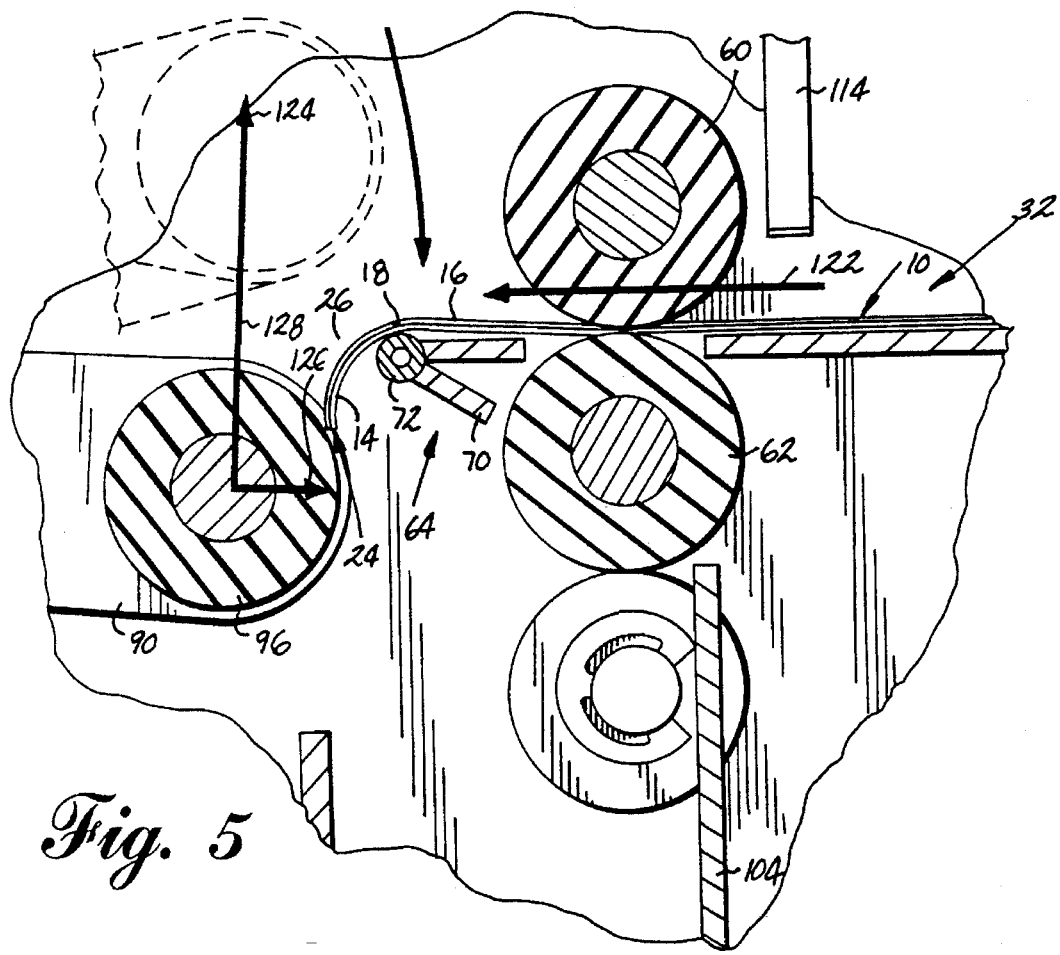
FIG. 5 is a side elevational view in section of a separation section of the label separator of FIG. 2 and showing a label entering the separation section.
Figure 6:
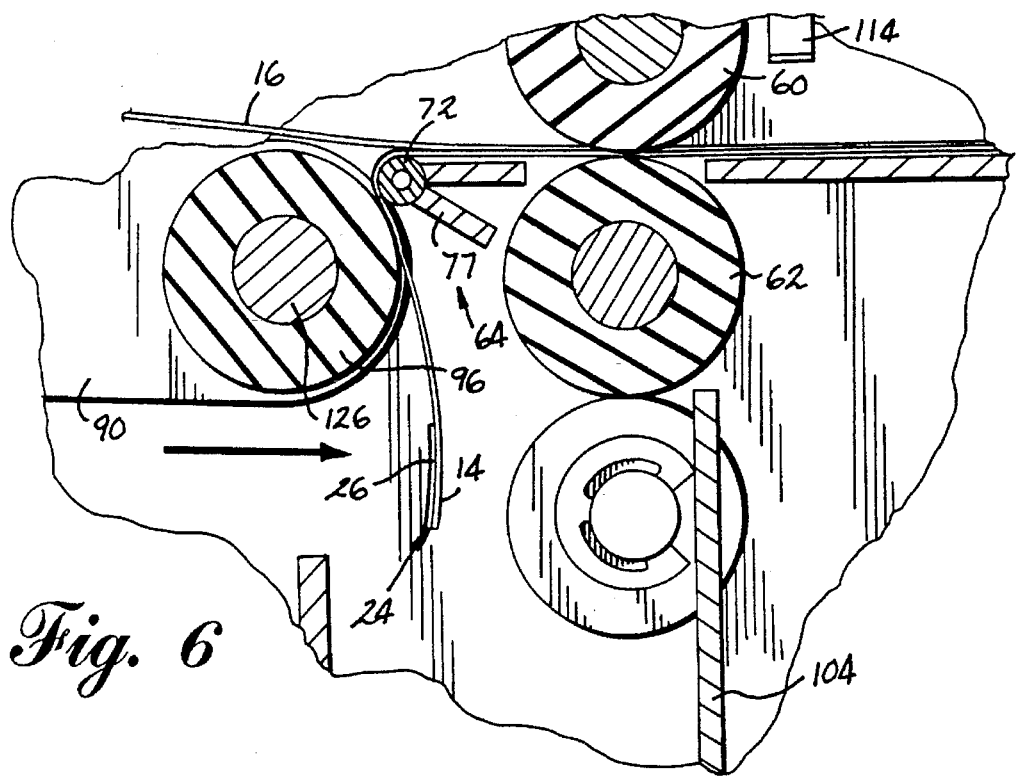
FIG. 6 is a side elevation view in section of the label separation section of the label separator of FIG. 2 and showing a label being removed from its protective backing.
Figure 7:
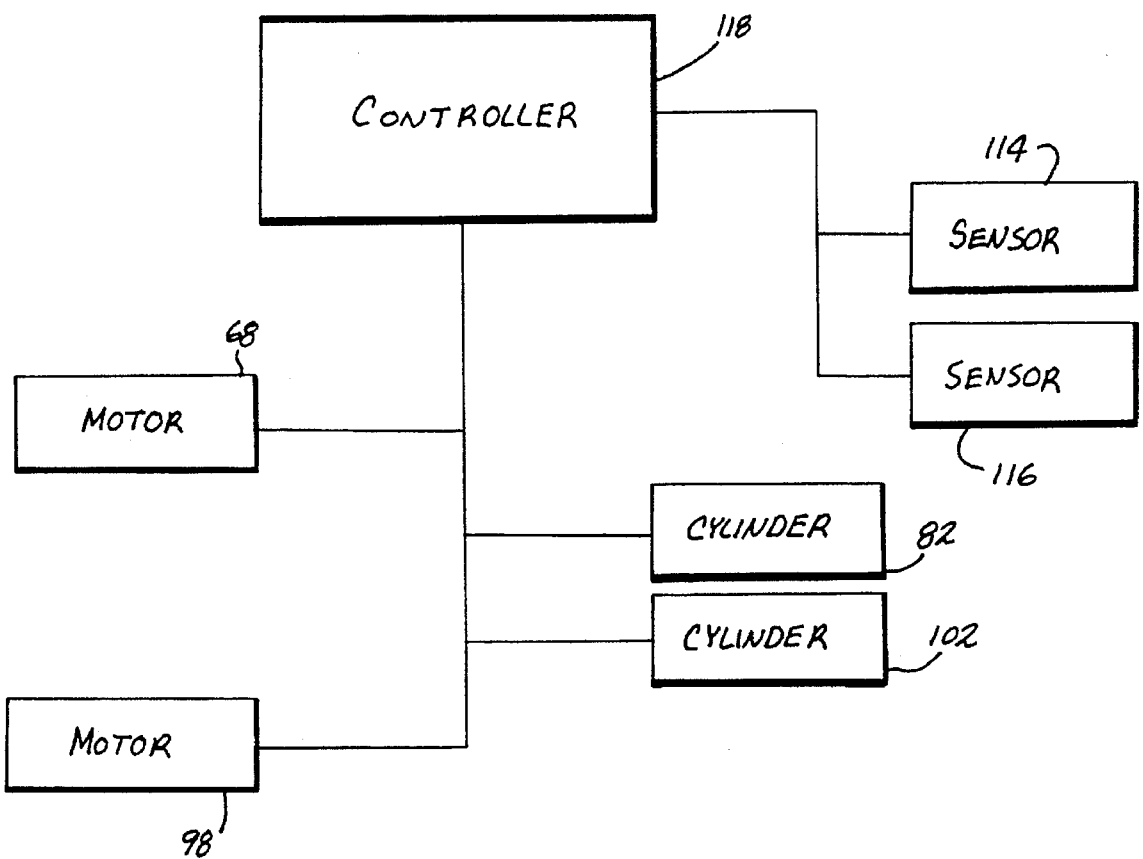
FIG. 7 is a block diagram representation of an electrical control arrangement for the separator.

Turning primarily to FIGS. 5 through 7 and referencing the other figures, operation of the label separator 30 is illustrated. A label 10 is placed on the loading platform 54 at the entry port 32 and beneath the entry sensor 114, with a leading edge adjacent feed rollers 60 and 62. The controller 118, in response to a signal from sensor 114, moves the label 16 to a label separating position by signalling stepping motor 68 to advance a predetermined number of steps sufficient to position the label 16 such that the label leading edge 24 is adjacent to, and preferably downstream of, the breaker bar leading edge 72. Prior to moving the label to the label separating position, the label separator 30 is in an initial position in which the horizontal cylinder 2 is retracted and the vertical cylinder 102 is extended. Accordingly, the pressing roller 6 is located above and to the rear of the breaker bar 64 in a first position 124. After the label has been advanced to the position wherein its leading edge 24 is adjacent the breaker bar edge 72, the controller operates cylinder 102 to the retracted position, thereby pulling the pressing roller 96 down to engage and move the leading end section 26 downwardly as illustrated in FIG. 5. Thereafter, controller 118 activates the cylinder 82 to extend the sliding frame 76 forwardly, thereby moving the pressing roller 96 to a position adjacent to and partially beneath the breaker bar 64, at a second position 126 shown in FIG. 5. The movement of the pressing roller 96 between the first and second positions 124 and 126 defines a pressing roller path 128.

At this time, the infeed and pressing roller stepper motors 68 and 98 are engaged. The pressing roller 96 causes the backing 14 to be directed downwardly into the exhaust chute 104. The infeed stepper motor 68 steps a predetermined number of steps to move the label forward past the breaker bar 64 and onto the exit rollers 36. The number of steps to accomplish this may be preprogrammed into the controller based upon the size of the label, or may be calculated based upon the detection of no label present by the infeed photosensor 114. After completing a label separating cycle and when a label 16 is sensed on the exit rollers 36 by the exit photo-sensor 116, the stepping motors 68 and 98 are de-energized and the breaker mechanism 66 is retracted to its starting position awaiting the next label.

It should be understood that the control algorithm will accommodate multiple labels spaced apart in the downstream direction on a single sheet of backing material 14 without excess label material 17. In such instance, the infeed photo-sensor 114 may be used to sense the gap between adjacent labels.

While the invention has been particularly described in connection with a specific embodiment thereof, it is to be understood that this is by way of illustration and not limitation, and the scope of the appended claims should be construed as broadly as the prior art will permit. Modifications may be made by those skilled in the art, particularly in light of the foregoing teachings. Reasonable variation and modification are possible within the scope of the foregoing disclosure of the invention without departing from the spirit of the invention.

For instance, alternative mechanisms may be used to control movement of the pressing roller 96 such as a linkage and stepper motor. Also, it should be understood that while a particular control algorithm has been described that alternative algorithms may be proposed by those of skill in the art. For instance, in high speed operations it may be desireable to time the engagement of the breaker mechanism 66 so that the infeed stepper motor 68 remains engaged throughout the cycle. The pressing roller 96 could comprise a non-rotating bar and could be other than parallel to the breaker bar 64, which itself need not be normal to the downstream direction. Furthermore, it is recognized that for certain label and backing materials it is not necessary that such a bar or the roller 96 be moved to a position partially beneath the breaker bar. Vertical travel of the labels 10 or other orientations are possible. Other variations and modifications are possible within the scope of the foregoing disclosure of the invention without departing from the spirit of the invention.

What is claimed is:

1. A label separator for separating an adhesive label from a backing, the backing having a leading edge and the label having a leading edge spaced from the leading edge of the backing to define a leading end between the leading edges, the label separator comprising:

an infeed mechanism;

a breaker bar disposed downstream of the infeed mechanism;

the infeed mechanism operative to move the label in a downstream direction through a label path to a separating position adjacent the breaker bar;

a sliding frame mounted for sliding movement toward and away from the breaker bar:

a push member pivotally mounted on the sliding frame and moveable from a first position through a push member path intersecting the label path adjacent the breaker bar to a second position engaging the leading end and directing the label end out of the label path;

whereby when the push member is moved along the push member path, the push member directs the leading end and the backing out of the label path, around the breaker bar and to one side of the push member while the label continues along the label path on another side of the push member.

2. A label separator according to claim 1 wherein the infeed mechanism comprises at least one infeed roller in frictional abutment with the label and wherein a stepping motor drives the infeed roller.

3. A label separator according to claim 1 wherein the push member comprises a roller oriented parallel to the breaker bar.

4. A label separator according to claim 1 and further comprising a base, the breaker bar and the sliding frame being mounted to the base, and further comprising at least one arm pivotally mounted relative to the base about a pivot axis, the push member being mounted to the at least one arm, and the pivot axis extending parallel to the push member and to the breaker bar and spaced apart from the push member, wherein pivotal movement of the at least one arm and push member about the pivot axis at least partially defines the push member path.

5. A label separator according to claim 4 wherein the push member comprises a pressing roller and a pressing roller motor is operably connected to the pressing roller to rotate the pressing roller.

6. A label separator according to claim 4, wherein the at least one arm is pivotally mounted to the sliding frame and wherein movement of the sliding frame and push member toward and away from the breaker bar at least partially defines the push member path.

7. A label separator according to claim 6 wherein the sliding frame is slidable in a first direction and the pivot axis is normal to the first direction.

8. A label separator according to claim 7 and further comprising a first cylinder between the base and the sliding frame for controlling movement of the sliding frame in the first direction and further comprising a second cylinder between the sliding frame and the at least one arm for controlling the movement of the arm about the pivot axis.

9. A label separator in accordance with claim 6 wherein the breaker bar comprises a horizontally extending plate and a downwardly directed return flange extending at an acute angle to the horizontally extending plate forming a leading edge of the breaker bar.

10. A label separator according to claim 1 and further comprising a sensor adjacent the infeed mechanism for sensing the presence of a label, and a controller connected to the sensor, the infeed mechanism and the push member for controlling the operation of the infeed mechanism and the push member.

11. A label separator according to claim 10 wherein the controller is responsive to the sensor to control the infeed mechanism to move the label downstream a predetermined distance such that the leading edge of the label is downstream of the breaker bar.

12. A label separator according to claim 11 wherein the controller is in further response to the sensor to control the push member to move from the first position to the second position when the label has moved downstream the predetermined distance.

13. A label separator according to claim 1 and further comprising at least one exit roller disposed adjacent and downstream of the breaker bar along the label path, the at least one exit roller having a plurality of annular lands and a non-stick coating for reducing the tendency of the label to adhere to the at least one exit roller.

14. A separating method in a label separator, comprising a breaker bar having a leading edge and a push member, for separating an adhesive label having a leading edge from a backing having a leading edge and wherein the leading edge of the label is spaced from the leading edge of the backing to define a leading end between the leading edges, the method comprising the steps of:

feeding a label toward the breaker bar, the movement of the label toward the breaker bar defining a downstream direction;

when the leading edge of the label backing is downstream of the breaker bar leading edge, moving the push member through a path wherein the push member pushes the leading end around the breaker bar and in a direction extending by at an angle of more than 90 degrees from the downstream direction; and moving the label over the breaker bar in the downstream direction thereby separating the label from the backing and moving the backing away from the breaker bar in a direction different than the downstream direction.

15. A method according to claim 14 and further comprising the steps of sensing the presence of a label with a sensor upstream of the breaker bar, and moving the label and the backing a predetermined distance to place the leading edge of the backing downstream of the breaker bar leading edge and the leading edge of the label upstream of the breaker bar leading edge.

16. A method according to claim 15 and further comprising the step of when the label is completely downstream of the breaker bar, sensing the presence of a label in the label path downstream of the breaker bar and stopping movement of the label.

17. A label separator for separating an adhesive label from a label backing, the label backing having a leading edge and the label having a leading edge spaced from the leading edge of the backing by predetermined distance to define a leading end, the label separator comprising:

an input side and an output side;

a breaker bar disposed between the input side and the output side and having a leading edge;

infeed mechanism operative to move the label and backing in a downstream direction from the input side toward the output side and to a separating position in which the leading edge of the label is disposed adjacent the leading edge of the breaker bar;

a sliding frame mounted for sliding movement toward and away from the breaker bar; and a push member pivotally mounted on the sliding frame and movable relative to the leading edge of the breaker bar to engage the leading end when the label is in the separating position and to divert the leading end from the downstream direction thereby causing the label to be separated from the backing.

18. The label separator in accordance with claim 17 and further comprising a base and wherein the breaker bar is mounted to the base in a first plane and the push member comprises a longitudinally extending push member bar disposed parallel to the plane of the breaker bar and movable from a first position adjacent one side of the plane and spaced from the breaker bar by a first predetermined distance defined in the plane to a second position adjacent another side of the plane opposite the one side and spaced from the breaker bar by a second predetermined distance defined in the plane, whereby the push member diverts the leading end in a direction out of the plane of the breaker bar when the label is in the separating position.

19. The label separator in accordance with claim 18 wherein the push member bar comprises a rotatable pressing roller.

20. The label separator in accordance with claim 19 and further comprising an electronic controller responsive to an input signal to control operation of the infeed mechanism and the pushmember.

* * * * *